United States Patent [19]

Allison et al.

[11] 4,165,884
[45] Aug. 28, 1979

[54] CHAIN LIFT FOR AUXILIARY AXLE ASSEMBLY

[75] Inventors: Blaine H. Allison; Richard F. Allison, both of Gainesville, Ga.

[73] Assignee: Allison Mfg. Inc., Gainesville, Ga.

[21] Appl. No.: 847,479

[22] Filed: Nov. 1, 1977

Related U.S. Application Data

[63] Continuation-in-part of Ser. No. 705,146, Jul. 14, 1976, Pat. No. 4,082,305.

[51] Int. Cl.² .................. B60G 17/00; B62D 61/12
[52] U.S. Cl. .................. 280/81 R; 180/24.02; 280/43.23; 280/704; 280/711
[58] Field of Search .................. 280/81 R, 676, 704, 280/711, 712, 713, 714, 43.17, 43.19, 43.23; 254/86 R, 86 H; 180/24.02

[56] References Cited

U.S. PATENT DOCUMENTS

| 2,087,255 | 7/1937 | Hickman | 180/24.02 X |
|---|---|---|---|
| 2,595,289 | 5/1952 | Peterson | 280/43.19 X |
| 2,712,856 | 7/1955 | MacPhee | 280/683 X |
| 2,721,405 | 10/1955 | Gardner | 180/24.02 X |
| 3,133,745 | 5/1964 | Granning | 280/112 R |
| 3,694,001 | 9/1972 | McGee | 280/712 |
| 3,704,896 | 12/1972 | Buelow | 280/43.23 X |
| 3,771,617 | 11/1973 | Hornung | 280/702 |
| 3,771,812 | 11/1973 | Pierce | 180/24.02 X |
| 3,784,221 | 1/1974 | Frasier | 180/24.02 |
| 3,915,470 | 10/1975 | Jansen | 180/24.02 |

*Primary Examiner*—Joseph F. Peters, Jr.
*Assistant Examiner*—Donn McGiehan
*Attorney, Agent, or Firm*—B. J. Powell

[57] ABSTRACT

A liftable auxiliary axle assembly for a wheeled vehicle including an auxiliary support frame assembly connected to the vehicle frame; a pair of spaced apart torque arms pivoted on the auxiliary frame assembly about a common pivot axis so that the rear end of each is pivotally movable in a generally vertical plane; a pair of axle seat assemblies mounted on the rear ends of the torque arms for pivoting movement therewith and mounting a wheel and axle assembly therebetween; and a pair of chain lift mechanisms for selectively lifting the wheel and axle assembly from the road.

7 Claims, 7 Drawing Figures

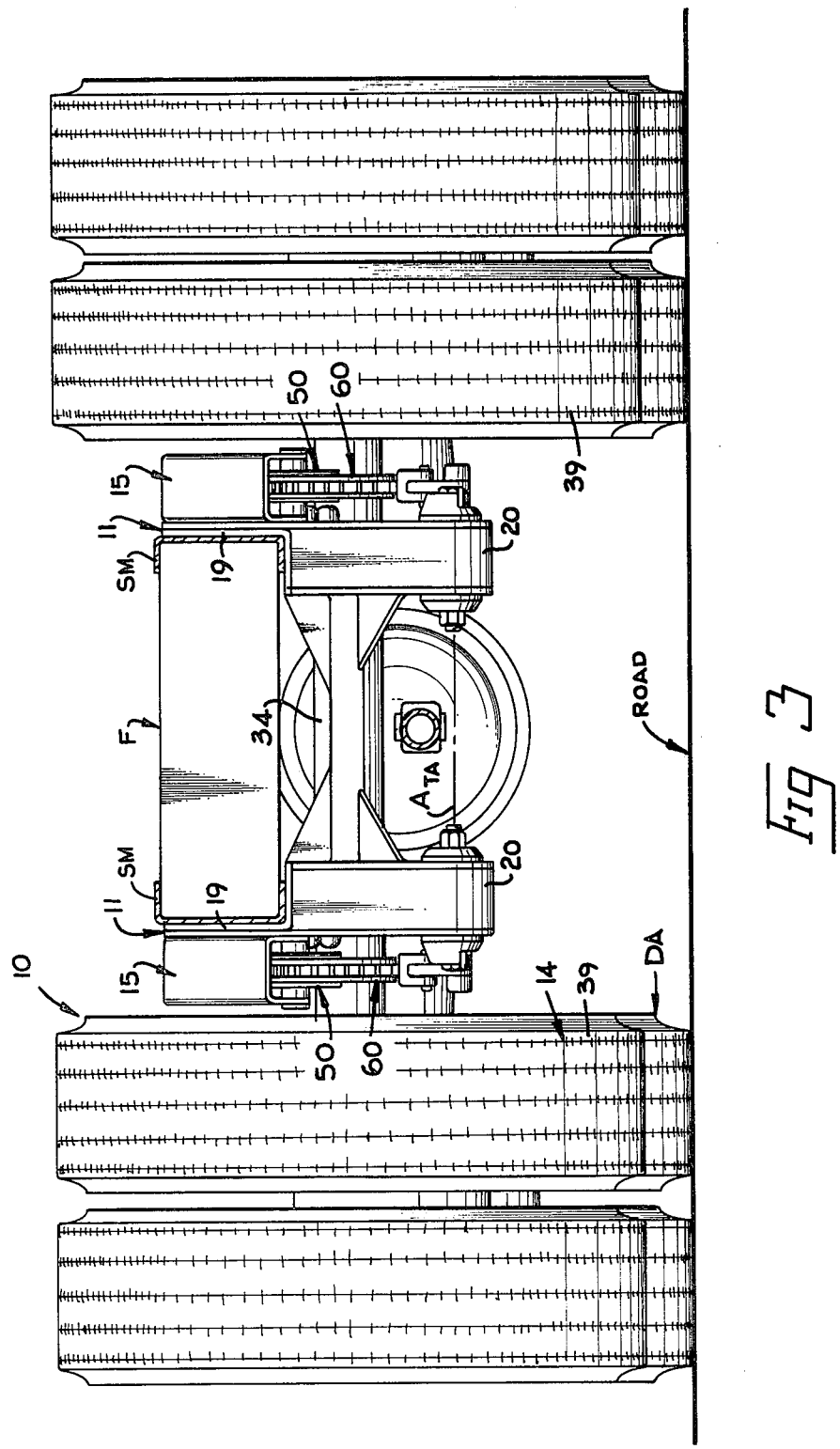

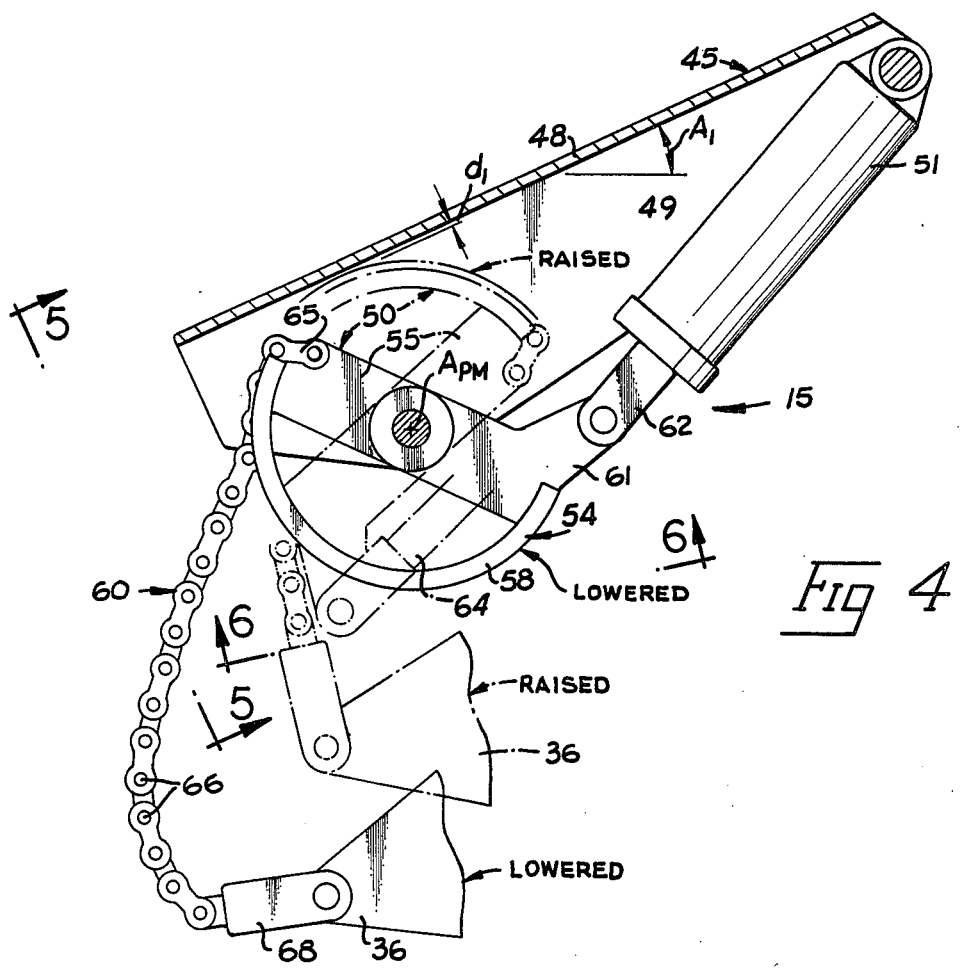
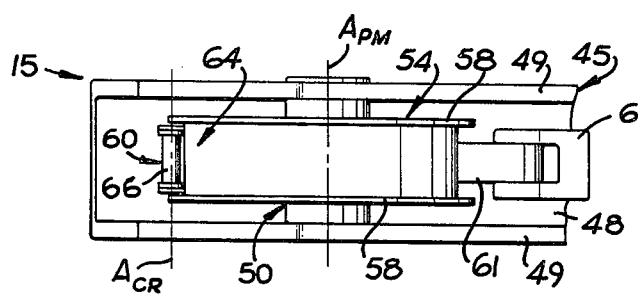
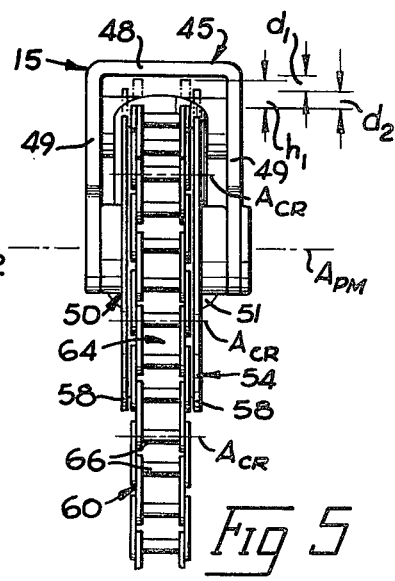
Fig 4
Fig 6
Fig 5

CHAIN LIFT FOR AUXILIARY AXLE ASSEMBLY

CROSS-REFERENCE TO RELATED APPLICATIONS

This application is a continuation-in-part of our co-pending application Ser. No. 705,146, filed July 14, 1976, entitled "AUXILIARY AXLE ASSEMBLY" now U.S. Pat. No. 4,082,305.

BACKGROUND OF THE INVENTION

Because it is frequently desirable to increase the load carrying capacity of a vehicle without increasing the maximum permissible load on each wheel and tire assembly of the vehicle as regulated by state law, auxiliary axle assemblies have been provided. A number of different auxiliary axle assemblies are presently available for the mounting on such vehicles. Usually, these auxiliary axle assemblies have the capability of being lifted from the road when the maximum permissible load for each wheel and tire assembly already provided on the vehicle is not exceeded. These liftable auxiliary axles are usually provided on various kinds of trucks where such trucks travel for a significant portion of the time during their use in an unloaded condition with the auxiliary axle lifted from the road. One type liftable auxiliary axle assembly is illustrated in U.S. Pat. Nos. 2,742,302; 3,133.735; 3,689,102; 3,713,663; and 3,747,948. A different type of liftable auxiliary axle assembly is illustrated in U.S. Pat. Nos. 3,502,348; 3,694;001; and 3,704,896. A number of different mechanisms for lifting these auxiliary axles have been proposed. One lifting mechanism has been the air bag springs normally used to spring the auxiliary axle where the deflation of the air bag is used to lift the axle. Another proposal is set forth in U.S. Pat. No. 3,325,181 which uses a separate air bag to lift the auxiliary axle. Yet another proposed mechanism is a fluid cylinder attached directly to the auxiliary axle in the frame on the vehicle such as that proposed in U.S. Pat. No. 3,704,896 while another proposal which uses cables in connection with a fluid cylinder is shown in U.S. Pat. No. 2,712,856. These lifting mechanisms suffer from several problems. One of these problems is that the lifting mechanism which must move with the auxiliary axle is relatively heavy making the axle difficult to spring when it is in its lowered road engaging position. Another of these problems is that the lifting mechanism is subject to failure and is expensive to replace. Another of the problems associated with the lifting device is that they are difficult to maintain in adjustment.

It is also frequently desirable to mount the auxiliary axle assembly rearwardly of the drive axles of the truck on which they are mounted as is illustrated in U.S. Pat. No. 3,704,896, especially trucks such as concrete mixers. One of the problems with mounting said auxiliary axle assembly rearwardly of the drive axles of the truck is that the moment applied to the truck chassis by the auxiliary axle assembly when it is in use frequently causes overloading of the front tires of the truck.

SUMMARY OF THE INVENTION

These and other problems and disadvantages associated with the prior art liftable auxiliary axle assemblies are overcome by the invention disclosed herein by providing a chain type lifting mechanism for the auxiliary axle assembly which is positive in operation, simple in construction, durable in service and inexpensive to repair. The axle assembly is also easily adjustable for axle alignment and installation. The invention also provides for mounting of the auxiliary axle assembly rearwardly of the drive axles of the vehicle at the rear end thereof while minimizing the moment transmitted to the front tires of the vehicle when the auxiliary axle assembly is in use.

The auxiliary axle assembly has an auxiliary support frame connectable to the vehicle frame on which a pair of spaced apart torque arm assemblies are pivotally mounted about a common pivot axis generally normal to the vehicle axis so that the torque arm assemblies can move individually or together in a generally vertical plane. The projecting ends of the torque arm assemblies each carry a seat assembly which mounts the auxiliary axle and the suspension air bag spring which is connected to the auxiliary support frame to spring the torque arm and seat assembly. The seat assemblies are axially movable along each of the torque arms and positively connected to the torque arm so that alignment of the auxiliary axle is simplified.

A pair of chain type lift mechanisms are mounted on the auxiliary support frame and connected to the auxiliary axle through the seat assemblies to selectively and positively lift the wheels on the auxiliary axle from the road. Each of the lift mechanisms has an arcuate pivot member pivoted about an axis spaced from the auxiliary axle with a flexible lift member such as a chain connecting the pivot member with the auxiliary axle. A lift cylinder pivots the pivot member about its axis so that the wheels on the auxiliary axle can be lifted from and lowered onto the road when the pivot member is pivoted.

To minimize the moment applied to the vehicle frame when the auxiliary assembly is mounted in an aft position rearwardly of the drive axles and thus reduce the additional load applied to the front tires of the vehicle when the auxiliary axle assembly is in use, the auxiliary support frame is connected to the vehicle frame so that the common pivot axis of the torque arm assemblies is rearwardly of the auxiliary axle while the air bag springs are located forwardly of the auxiliary axle. Since the primary moment applied to the vehicle frame by the auxiliary axle assembly is applied through the air bag springs, the distance between the drive axles and the air bag springs is minimized, thereby minimizing the moment applied to the vehicle frame.

These and other features and advantages of the invention disclosed herein will become more apparent upon consideration of the following specification and accompanying drawings wherein like characters of reference designate corresponding parts throughout the sevral views and in which:

BRIEF DESCRIPTION OF ILLUSTRATIVE EMBODIMENTS

FIG. 3 is a front view of the invention showing the vehicle frame in transverse cross-section;

FIG. 4 is an enlarged longitudinal cross-sectional view of the lift mechanism; showing the internal construction thereof;

FIG. 5 is an end view of the lift mechanism as seen in FIG. 4 taken along line 5—5 in FIG. 4;

FIG. 6 is a partial bottom view of the lift mechanism taken along line 6—6 in FIG. 4.

These figures and the following detailed description disclose specific embodiments of the invention; however, it is to be understood that the inventive concepts are not limited thereto since they can be incorporated in other forms.

DETAILED DESCRIPTION OF ILLUSTRATIVE EMBODIMENTS

Figure 1:
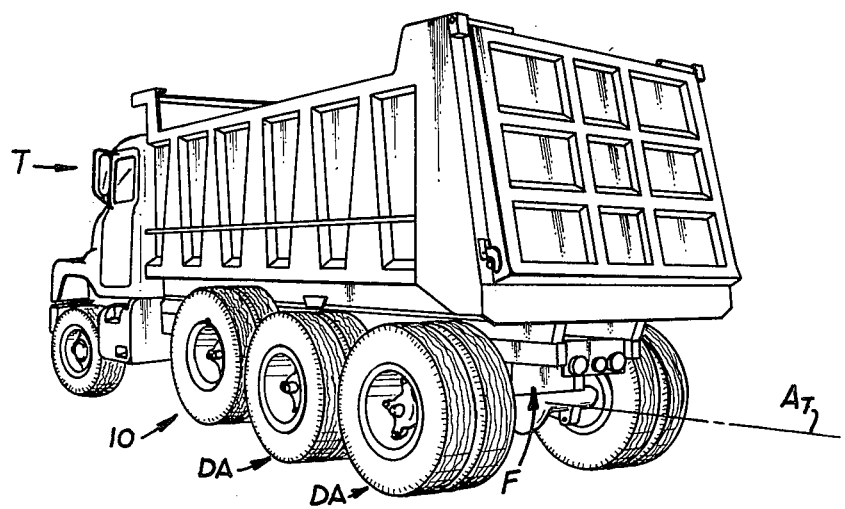
FIG. 1 is a perspective view illustrating the invention installed on a vehicle.

Referring to the figures, it will be seen that the invention is incorporated in an auxiliary axle assembly 10 and is adapted to be mounted on a truck T best seen in FIG. 1. The truck T has a main frame F including a pair of spaced apart longitudinally extending frame side members SM (FIGS. 2 and 3) which mount the main truck drive axle units DA (FIGS. 1 and 2) thereon so that the truck T is movable along its longitudinal axis A (FIG. 1). While the auxiliary axle assembly 10 may be mounted forwardly or rearwardly of the drive axle units DA, it is illustrated mounted forwardly of the drive axle units DA in FIGS. 1-6 and illustrated mounted aft of the drive axle units DA in FIG. 7.

Figure 2:
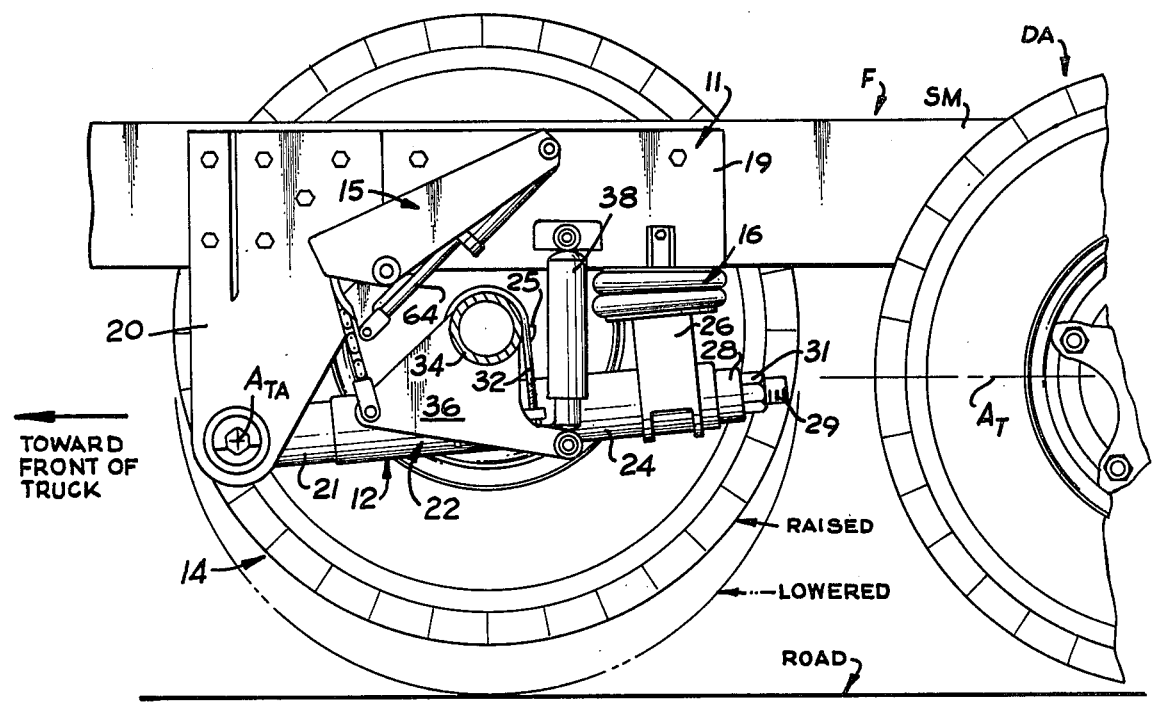
FIG. 2 is a side elevational view of the invention with one wheel and tire assembly removed therefrom.

The auxiliary axle assembly 10 has a pair of an opposed auxiliary support frames 11, one being mounted on the outside of each of the side members SM of the main frame F as seen in FIGS. 2 and 3. Each auxiliary support frame 11 pivotally mounts a torque arm assembly 12 thereon which projects rearwardly under the side members SM. The torque arm assemblies 12 mount a wheel and axle assembly 14 therebetween under the truck frame F. A pair of lift mechanisms 15 are provided for selectively lifting the torque arm assemblies 12 and wheel and axle assembly 14 from contact with the road, and a pair of air bag springs 16 spring the wheel and axle assembly 14 when it is in contact with the road.

The auxiliary support frames 11, wheel and axle assembly 14 and torque arm assemblies 12 are similar in construction and operation to those described in our copending application Ser. No. 705,146 and incorporated herein by reference. Each support frame 11 has a side plate 19 and a support beam 20 which depends below the side members SM of truck frame F and pivotally mounts the torque arm 21 of the torque arm assembly 12 in the depending end thereof so that that the torque arm assemblies 12 both pivot about a common arm pivot axis $A_{TA}$ normal to the truck axis $A_T$. Each torque arm 21 is connected to the wheel and axle assembly 14 through an axle seat assembly 22 see in FIG. 2. Each seat assembly 22 has a mounting tube 24 slidably received over torque arm 21 which mounts both an axle seat 25 and an air bag seat 26 thereon. The mounting tube 24 is adjustably fixed axially along torque arm 21 by an internally threaded adjustment member 28 rotatably connected to tube 24 and screwed onto a stud 29 extending from the projecting end of torque arm 21 and locked in place by lock nut 31. The operation of this construction is fully set forth in application Ser. No. 705,146 and will not be repeated here. U-bolts 32 lock the axle 34 of wheel and axle assembly 14 onto each axle seat 25. A hanger plate 36 is also connected to both the axle seat 25 and axle 34 on the outboard side of each axle seat assembly 12. One end of the hanger plate 36 is connected to a shock absorber 38 or stabilizer spring (not shown) which is also connected to the auxiliary support frame 11 to stabilize the movement of wheel and axle assembly 14.

One of the lift mechanisms 15 is mounted on each of the auxiliary support frames 11 and is connected to the opposite end of the hanger plate 36 under the lift mechanism 15 so that the wheels 39 of the wheel and axle assembly 14 can be selectively lifted out of engagement with the road surface when the air bag springs 16 are deflated. When the lift mechanisms 15 lower the wheels 39 of the wheel and axle assembly 14 into engagement with the road surface and the air bag springs 16 are inflated, the auxiliary axle assembly 10 assists the drive axles DA in supporting the vehicle.

Each lift mechanism 15 as seen in FIGS. 4-6 includes an inverted U-shaped lift frame 45 attached to the outside of the support beam 20 and the side plate 19 of the auxiliary support frame 11 which carries the lift mechanism 15. The lift frame 45 is attached to the support frame 11 so that the upper central web 48 of the frame 45 defines an included angle A, with the horizontal truck axis $A_T$. The forward ends of the depending legs 49 of the lift frame 45 as seen in FIGS. 2 and 4 rotatably journal a pivot member 50 therebetween about a horizontal pivot axis $A_{PM}$ generally normal to the truck axis $A_T$ and parallel to the common torque arm pivot axis $T_{TA}$. A lift cylinder 51 is pinned at its closed end between the rear ends of the legs 49 of the lift frame 45 as seen in FIGS. 2 and 4.

The pivot member 50 has a generally semicircular lift rim 54 carried by a central support 55 seen in FIG. 4 so that the center of the outside radius of curvature R, of the rim 54 coincides with the axis $A_{PM}$. The rim 54 has a generally U-shaped cross-section as seen in FIG. 6 to define a lift member receiving channel 56 along the length of the rim 54. The upstanding side flanges 58 of the rim 54 serve to assist in captivating the lift member 60 as will become more apparent. One end of the central support 55 is provided with a driving extension 61 as seen in FIG. 4 which is pinned to the clevis 62 on the projecting end of the piston rod 64 movably mounted in lift cylinder 51. The pivot member 50 is shown in its lowered position by solid lines in FIG. 4 with the piston rod 64 retracted so that the wheels 39 are lowered into contact with the road surface; and in its raised position by phantom lines in FIG. 4 with the piston rod 64 extended so that the wheels 39 are raised out of contact with the road surface. It will also be noted that the outside radius $R_1$ is sufficient so that the flanges 58 pass within a small clearance distance $d_1$ seen in FIG. 4 when the pivot member 50 is in its raised position and that the channel 56 has a depth $d_2$ as will become more apparent.

The lift member 60 is a roller chain with its uppermost link 65 pinned to that end of the central support 55 opposite the driving extension 61 so that the lift member 60 is laterally in registration with that end of channel 56 opposite the extension 61 attached to the cylinder clevis 62. It will be noted that the roller chain 60 is flexible in a direction normal to the axes $A_{CR}$ of the rollers 66 in chain 60 but is relatively inflexible in the direction of the axes of the rollers 66. This helps to keep the chain 60 in lateral registration with the channel 56 in pivot member 50 even when the pivot member 50 is in its lowered position seen in solid lines in FIG. 4 yet the chain 50 can flex enough to free the axle 34 for its sprung movement under the influence of air bag spring 16 when it is lowered. A clevis 68 on the lower end of chain 50 is pinned to the leading end of hanger 36 opposite shock absorber 38 as seen in FIG. 2 to connect the chain 50 with the axle seat assembly 22 and thus the wheel and axle assembly 14.

From the foregoing, it will be seen that, as the pivot member 50 is rotated clockwise from its lowered solid line position in FIG. 4 toward its raised phantom line position, the roller chain 60 will be wrapped around the rim 54 on pivot member 50 in the channel 56. Because the maximum chain height $h_1$ (FIG. 4) is slightly less than the clearance distance $d_1$ plus the channel depth $d_2$, the chain 50 will just clear the underside of the upper central web 48 of the lift frame 45. This serves to maintain the chain 50 within the channel 56 in pivot member 50 and thus prevent malfunctioning of the lift mechanism 15.

To raise the wheel and axle assembly from the road, the air bag springs 16 are first deflated. Then the lift cylinders 51 of the lift mechanisms 15 are powered from an appropriate power supply such as the pressurized air supply normally available on the truck to extend the piston rods 64 toward their extended positions shown in FIG. 2 and by phantom lines in FIG. 4. This rotates the pivot members 50 to wrap the lift members 60 around the rims 54 and lifts the wheel and axle assembly 14 out of contact with the road. This process is reversed to lower the wheel and axle assembly 14 back into contact with the road.

AFT MOUNTING

Figure 7:
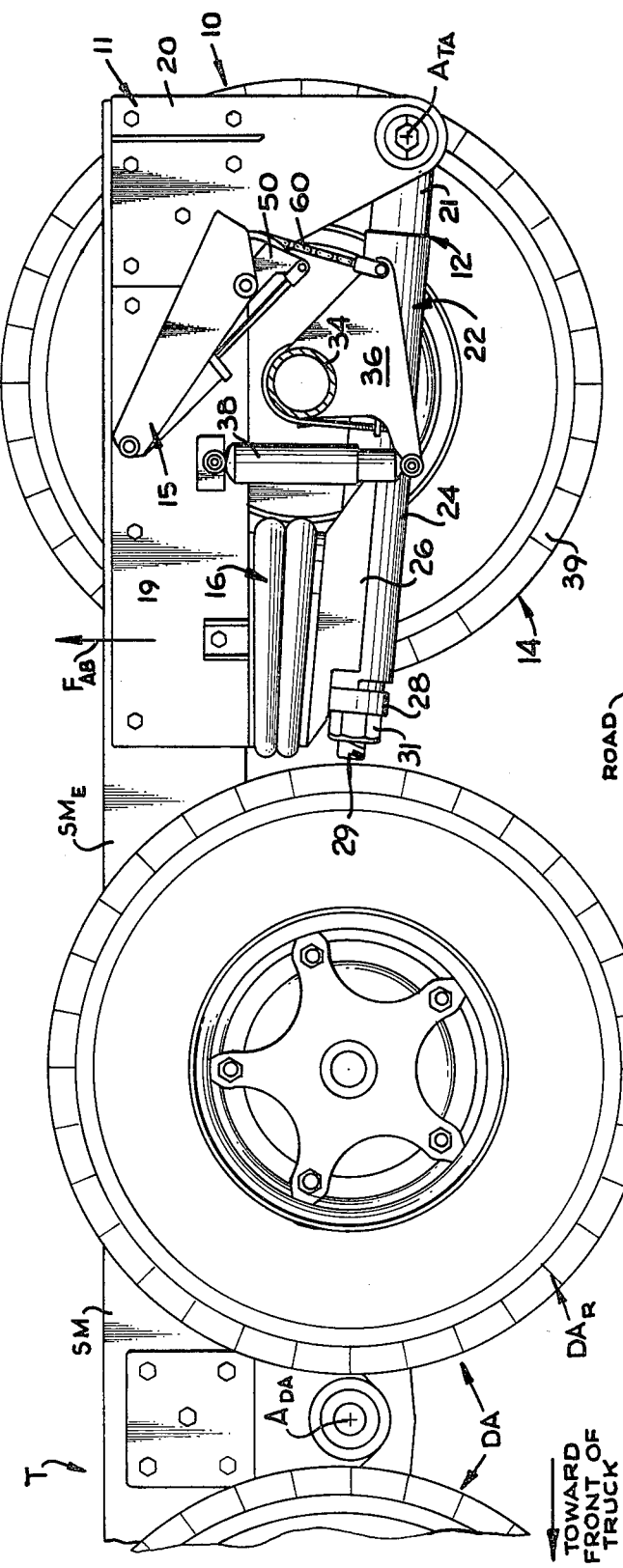
FIG. 7 is a side elevational view of the invention with one wheel and tire assembly removed as installed in an aft position rearwardly of the drive axles.

FIG. 7 illustrates the auxiliary axle assembly 10 mounted in an aft position on a truck T rearwardly of the drive axle units DA. This type mounting is frequently used on trucks mounting concrete mixers thereon. When auxiliary axles are mounted in this aft position, the forces exerted on the truck frame F by the auxiliary axle usually generate a force moment on the frame tending to overload the front wheels of the truck. This moment is usually generated so as to pivot the main frame about the pivot connection between the main drive axle units and the main frame.

The auxiliary axle assembly 10 is mounted in FIG. 7 so as to minimize the moment of force applied to the main truck frame F tending to overload the front wheels of the truck. The moment of force is usually centered on the common transverse pivot axis $A_{DA}$ about which the drive axle units DA are connected to the truck frame F since the suspension system is usually of the floating type. The axle assembly 10 is mounted on the truck frame side members or side member extensions $SM_E$ rearwardly of the drive axle units DA so that the common torque arm axis $A_{TA}$ lies rearwardly of the axle 34 of the wheel and axle assembly 14. The air bag springs 16, however, lie forwardly of the axle 34 adjacent the rearmost drive axle $DA_R$. The upward moment generating forces applied to the truck frame F are primarily applied through the air bag springs 16 as indicated by the arrow $F_{AB}$ in FIG. 7. The net result of this arrangement is that the forces $F_{AB}$ are applied to the truck frame F as close as possible to the drive axle pivot axis $A_{DA}$ thus minimizing the moment of force applied to the truck frame F tending to overload the front wheels.

We claim:

1. In a liftable auxiliary axle assembly for a wheeled vehicle including a wheel and axle assembly with road engaging tires thereon, an auxiliary axle frame mounting said wheel and axle assembly thereon and pivotally connecting the wheel and axle assembly to the vehicle frame about a common generally horizontal pivot axis generally normal to the longitudinal axis of the vehicle so that the road engaging tires of the wheel and axle assembly can be lifted out of engagement with the road surface as the auxiliary axle frame is pivoted about the common pivot axis, the combination therewith of a lift mechanism comprising:
   (a) a lift pivot member pivotally connected to the vehicle frame about a lift pivot axis fixed with respect to the vehicle frame, said lift pivot member defining an arcuate support surface thereon having a radius of curvature whose center generally coincides with said lift pivot axis;
   (b) an inextensible lift member flexible in a first plane so that said lift member can bend along said arcuate support surface, said lift member operatively connected to the wheel and axle assembly and attached to said lift pivot member so that said lift member is not movable lengthwise of said arcuate support surface and so that said lift member is wrapped along said arcuate support surface as said lift pivot member is pivoted about said lift pivot axis in a first rotational direction to selectively cause said lift member to lift the wheel and axle assembly from engagement with the road surface; and
   (c) drive means for selectively pivoting said lift pivot member about said lift pivot axis to selectively raise from and lower onto the road surface the road engaging tires.

2. In the liftable axle assembly as set forth in claim 1, wherein said lift mechanism further includes a lift frame connected to the vehicle frame and pivotally mounting said pivot member about said lift pivot axis, said lift frame including guide means for maintaining said lift member in operative position on said lift pivot member as said lift pivot member is pivoted.

3. In the liftable axle assembly as set forth in claim 2 wherein said drive means includes a fluid cylinder having an extendible piston rod, said fluid cylinder connected to said lift frame and said piston rod connected to said lift pivot member to selectively pivot said lift pivot member as said piston rod is extended and retracted.

4. In the liftable axle assembly as set forth in claim 3 wherein said lift member is substantially inflexible in a second plane generally normal to the first plane in which said lift member is flexible to assist in maintaining said lift member in registration with said arcuate support surface.

5. In the liftable axle assembly as set forth in claim 4 wherein said lift member is a roller chain.

6. In a liftable auxiliary axle assembly for wheeled vehicle including a wheel and axle assembly with road engaging tires thereon, an auxiliary axle frame mounting said wheel and axle assembly thereon and pivotally connecting the wheel and axle assembly to the vehicle frame about a common generally horizontal pivot axis generally normal to the longitudinal axis of the vehicle so that the road engaging tires of the wheel and axle assembly can be lifted out of engagement with the road surface as the auxiliary axle frame is pivoted about the common pivot axis, the combination therewith of a lift mechanism comprising:
   a generally inextensive lift member operatively connected to said wheel and axle assembly, said lift member flexible in a first direction and generally inflexible in a second direction normal to the first direction;

a support member defining an arcuate support surface thereon over which said lift member passes, said arcuate support surface having a generally horizontal axis of curvature and located generally in vertical alignment with the connection between said lift member and said wheel and axle assembly so that when said lift member passes circumferentially about the axis of curvature on said arcuate support surface, said arcuate support surface causes that portion of said lift member connected to the wheel and axle assembly to be vertically displaced to selectively lift the tires of the wheel and axle assembly out of engagement with the road surface; and drive means operatively connected to said lift member to affect movement of said lift member circumferentially along said arcuate support surface whereby that portion of said lift member connected to the wheel and axle assembly selectively lifts said wheel and axle assembly from the road surface.

7. In combination with a wheeled vehicle having a vehicular frame with front wheels adjacent the front end of the vehicular frame and a pair of rear drive axle units pivotally connected adjacent the rear end of the vehicular frame about a common drive axle transverse pivot axis normal to the longitudinal axis of the vehicle, a liftable auxiliary axle assembly mounted on the vehicular frame rearwardly of the drive axle units comprising:

an auxiliary wheel and axle assembly including an auxiliary axle and road engaging tires rotatably mounted on said auxiliary axle;

an auxiliary axle frame mounting said auxiliary wheel and axle assembly thereon for movement therewith and pivotally connecting said auxiliary wheel and axle assembly to the vehicular frame about a generally horizontal auxiliary pivot axis generally normal to the longitudinal axis of the vehicle so that said road engaging tires of said auxiliary wheel and axle assembly can be lifted out of engagement with the road surface as said auxiliary axle frame is pivoted about said auxiliary pivot axis, said auxiliary pivot axis located rearwardly of said auxiliary axle of said auxiliary wheel and axle assembly with respect to the vehicle to locate said auxiliary wheel and axle assembly rearwardly of and adjacent to the rearmost drive axle unit on the vehicle; and springing means operatively connected between said auxiliary axle frame at a position forwardly of said auxiliary axle and the vehicular frame at a position rearwardly of the common drive axle pivot axis of the drive axle units to selectively spring said auxiliary wheel and tire assembly so that the upward force applied to the vehicular frame by said springing means to spring said auxiliary wheel and axle assembly generates a minimum moment of force in the vehicular frame about the common drive axle transverse pivot axis tending to overload the front wheels.

* * * * *